United States Patent [19]
Granberg

[11] 3,935,757
[45] Feb. 3, 1976

[54] CHAIN SAW TOOL

[76] Inventor: Elof Granberg, 200 S. Gerrard, Richmond, Calif. 94801

[22] Filed: Jan. 13, 1975

[21] Appl. No.: 540,429

[52] U.S. Cl. .................................. 76/74; 33/202
[51] Int. Cl.² ................... B23D 63/16; G01B 5/02
[58] Field of Search .......... 76/25 A, 36, 74; 33/202

[56] References Cited
UNITED STATES PATENTS

| | | | |
|---|---|---|---|
| 2,682,791 | 7/1954 | Lahaie | 33/202 X |
| 2,705,376 | 4/1955 | Cox | 33/202 |
| 2,898,782 | 8/1959 | Consoletti | 76/25 A |
| 3,055,115 | 9/1962 | Tyrrell | 33/202 |
| 3,055,238 | 9/1962 | Hazzard | 76/25 A |
| 3,338,116 | 8/1967 | McLean | 76/25 A |
| 3,365,805 | 1/1968 | Carlton | 33/202 |

Primary Examiner—Al Lawrence Smith
Assistant Examiner—Nicholas P. Godici
Attorney, Agent, or Firm—Bruce & McCoy

[57] ABSTRACT

A tool for placing on a saw chain for guiding a round file for sharpening the cutting edge of a saw chain cutting tooth and for measuring the parameters of a saw chain.

2 Claims, 8 Drawing Figures

U.S. Patent  February 3, 1976  3,935,757
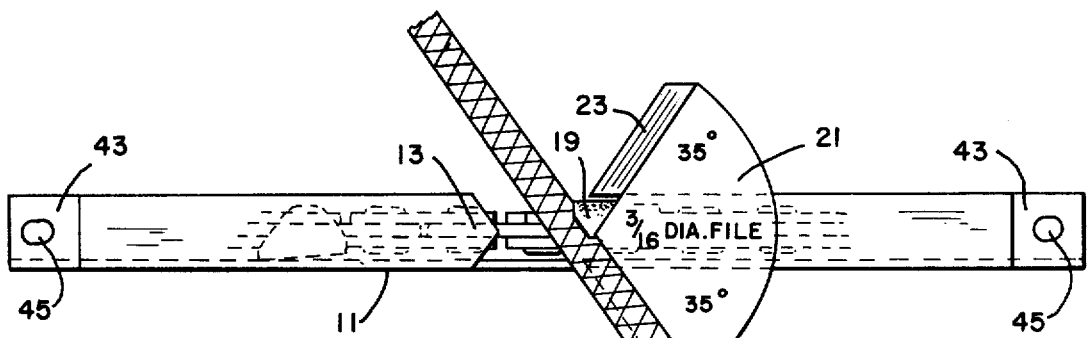
FIG.—1
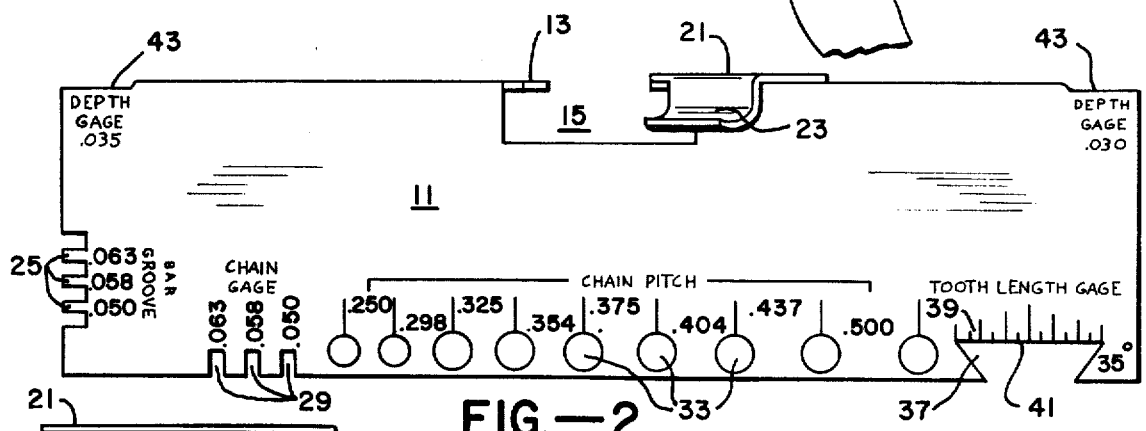
FIG.—2
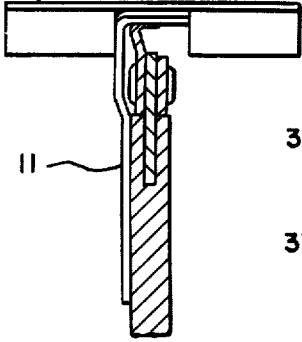
FIG.—3
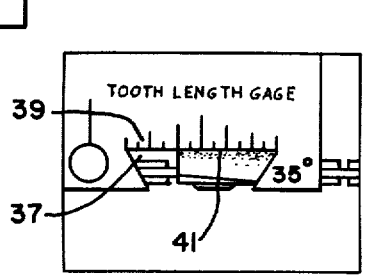
FIG.—4
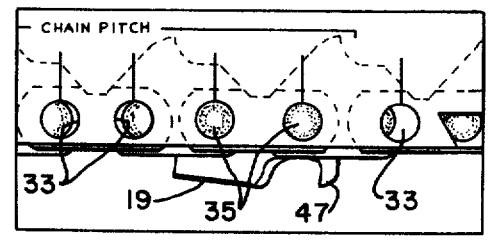
FIG.—5
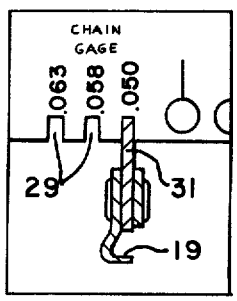
FIG.—6
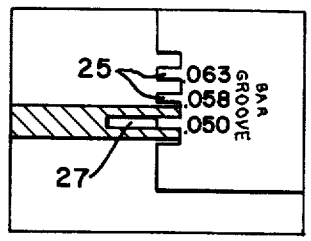
FIG.—7
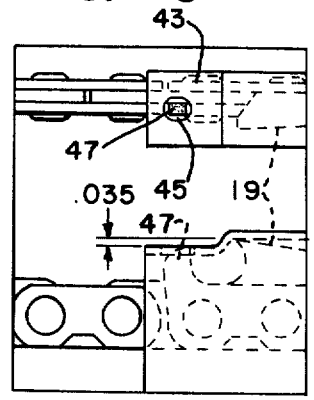
FIG.—8

3,935,757

CHAIN SAW TOOL

FIELD OF THE INVENTION

The present invention relates to a tool for the saw chains of chain saws and more particularly to a tool which can be placed on top of a saw chain to permit a file to be used to sharpen the teeth of a saw chain and to be in other ways engaged with the saw chain for the purpose of measuring the height of the saw chain cutter link depth gauges; the width of the cutting bar groove; the gauge of the chain; the tooth length; and the chain pitch.

DESCRIPTION OF THE PRIOR ART

Several devices have been devised for the purpose of setting the depth gauge on each of the individual cutter links to accurately insure the proper cutting depth of the saw chain. These devices are available in a variety of configurations none of which appear in the form which can be incorporated into a tool which measures the other portions of the saw chain.

There are also chain saw cutter bar groove gauges. These are individual different units for each cutter bar groove size, such as a set of feeler gauges, which do not incorporate into the same gauge a means for measuring a variety of different groove widths.

While a ruler can be utilized for measuring the tooth length and for measuring the chain pitch and a michrometer can be used to measure the chain gage, and a protractor can be used to determine the correct angle across the cutting edge of the cutter link there is no tool known which combines all of these abilities into one combination gauge which is particularly adoptable for measuring the important parameters of a saw chain.

There are also devices which can be placed upon a saw chain for the purpose of aligning a file with the cutting edge of a cutter link. Certain guide lines are provided on that device for indicating the filing position that should be utilized for the file for sharpening the tooth. However, the device does not guide the file for accurate sharpening of a tooth. It is quite obvious that a hand guided file will rock when traversing across the cutting edge because it is so short and will not provide as accurate a cutting edge as can be obtained when the file is accurately guided by mechanical means.

Therefore a need exists in the field of chain saw tools for a device for sharpening chain saws in which is provided in one unit the means to measure all of the important parameters of a saw chain and which can also be utilized for the purpose of sharpening the saw chain.

SUMMARY OF THE INVENTION

The present invention is a chain saw tool which comprises a plate having a flange extending outward therefrom on at least one side of the plate. The plate includes an opening intermediate thereof to permit a file to project therethrough. A file guide is secured to the plate adjacent said opening and provides a surface against which cutter tooth sharpening file may be disposed and reciprocated. The guide surface permits the chain saw cutting tooth to be accurately sharpened when it is disposed against the plate under the top flange and when the cutting surface of the tooth is in contact with a file being reciprocated against the guide surface.

The tool of the invention is also a combined gauge which has a file guide disposed at the top thereof for guiding the file at a 35° angle across the cutting edge of a cutter link of a chain saw held against the plate and which guide can also be utilized simply as gauge for gaging whether the proper angle of slice has been placed on the cutting edge of the cutter link.

The gauge also includes a precise set of graduated projections formed along the edge of the plate for measuring the cutting bar groove width and a precise set of graduated recesses also for measuring the chain gage. The tool also includes a set of precisely graduated aligned circular holes disposed in the plate for measuring the chain pitch as well as a trapezoidal recess formed in one edge of the plate with precise graduations along the base edge of the recess for measuring the cutting tooth length. A pair of holes are also disposed in the plate at predetermined different heights below a surface of said plate whereby the height of the depth gauge of a chain saw cutter link can be measured to determine the depth of cut the saw chain is set for.

OBJECTS OF THE INVENTION

It is therefore an important object of the present invention to provide a tool which guides a file for permitting accurate sharpening of the cutting edge of a cutter link of a saw chain.

It is another object of the present invention to provide a gauge incorporating the means of measuring the chain pitch, the chain gage, the cutter bar groove width, the height of the cutter link depth gauge, the length of a cutter tooth, and the angle of slice on the cutter tooth, all in one combined measurement tool.

It is a further object of the present invention to provide a simple device to perform these measurement and sharpening functions which can be manufactured relatively simply and inexpensively from basically stamped parts.

And it is still another object of the present invention to provide a chain saw tool gauge which combines the functions of sharpening saw chain cutter links as well as measuring the various parameters of the saw chain into a simple single device so that a person repairing chain saws need carry only one tool instead of a variety of different ones.

Further objects of the present invention will become apparent when it is considered in conjunction with the accompanying drawings and description.

DESCRIPTION OF THE DRAWINGS

FIG. 1 of the drawings is a top plan view of the present invention showing a saw chain in position with respect to the tool for sharpening as well as a file in position with respect to the tool and the chain for sharpening the cutter tooth;

FIG. 2 of the drawings shows a side elevation of the present invention;

FIG. 3 of the drawings shows an end elevation of the present invention with a saw chain disposed in position with respect to the tool for sharpening;

FIG. 4 of the drawings shows a saw chain disposed in position with respect to the cutting tooth length measurement gauge of the present invention;

FIG. 5 of the drawings shows a saw chain disposed in position with respect to the chain pitch measurement gauge of the present invention;

FIG. 6 of the drawings shows a saw chain link disposed in position with respect to the chain gage measurement gauge of the present invention;

FIG. 7 of the drawings shows a cutter bar of a chain saw engaged with the bar groove measurement gauge of the present invention; and FIG. 8 of the drawings shows a saw chain cutter link disposed in position with respect to the present invention for the purpose of measuring the height of the depth gauge portion of the link.

DESCRIPTION OF THE PREFERRED EMBODIMENT

The present invention is comprised of basically a plate 11 which has a flange 13 extending outward therefrom. While the flange could extend outward on each side of the plate it is only necessary that it extend out on at least one side of the plate generally perpendicularly thereto. As a result of this single need, the plate can be stamped as a single unit and then bent along the top edge to form the top flange.

Intermediate the plate is an opening or recess 15 through which the sharpening file 17 can project while sharpening the cutter link 19 of the saw chain. In the preferred embodiment, this recess and the flange are located at the top of the plate, for simplicity of construction, and intermediate the length of the plate and flange. In the preferred embodiment a pair of flanges are utilized and are disposed on opposite sides of the recess and extend to the ends of the plate and outward from the plate a sufficient distance to permit a saw chain to be disposed under the flanges. The tool can be placed on top of a saw chain, with the chain disposed underneath the flanges and supported thereby with a cutter link being at least partially exposed between the inner adjacent ends of the flanges in the recess. In the top plan view, at least a portion of the chain would be exposed between the flanges when the tool was placed on top of a saw chain as shown in FIG. 1.

A file guide 21 is secured to the plate adjacent the opening and provides a guide surface 23 against which a sharpening file may be disposed and reciprocated. The file is disposed along the guide surface of the file guide and through said opening in said plate to accurately sharpen a saw chain cutter link which is disposed against the plate under the flange. The file guide includes at least one guide surface which lies in a horizontal plane perpendicular to the plate and is angularly disposed with respect to the plate at approximately a 35° angle. When it is said that the guide surface lies in a horizontal plane perpendicular to the plate, it is meant that the guide surface actually supports a file in a plane which is horizontal and perpendicular to the plate. The 35° angle is the angle that the file makes with respect to the plate in the horizontal plane. This angle has been determined to be the optimum slice angle on which the cutting edge of a cutter link should be formed. This is called the top plate angle.

The guide surface 23 of the file guide is the mechanism which guides the file and is formed to conform to at least a portion of the external surface of the sharpening file. In the preferred embodiment, it has been found that a hardened concave surface which is approximately quarter round serves sufficiently to guide the file during the sharpening procedure.

Because saw chain cutter links can have the top plate angle running in either direction, a pair of the file guide surfaces are provided in the preferred embodiment to extend from opposite sides of the plate and have an included angle of 70°. In other words each file guide surface is disposed in an angle of 35° with respect to the plate.

In the preferred embodiment a simple small stamped and hardened part is spot welded to one of the top flanges on the file guide for providing the file support or guide surfaces. The preferred configuration for the guide can be seen in FIGS. 1 and 2 of the drawings.

The chain saw tool also includes in a very compact form and with an unique arrangement a series of gauges which can be utilized for measuring all of the important parameters of a saw chain. The file guide disposed at the top of the plate for guiding the sharpening file is actually a gauge for measuring whether or not the top plate angle is disposed at a 35° angle or whether it has been worn to a different angle and whether the edge needs sharpening. In other words, it is a guage of sharpness and of correct top plate angle on a cutter link.

The tool is also a gauge which has a precise set of graduated projections 25 formed along the edge of the plate for measuring the cutting bar groove width. These projections are different width rectangular projections formed in precise thicknesses or widths of 50 thousandths (0.050), 58 thousandths (0.058), and 63 thousandths (0.063) of an inch which are the standard cutter bar groove widths. These projections are actually recessed for protection against damage, such as bending, and for simplicity of construction. During use, the projections can be inserted into the groove 27 of a cutter bar of a chain saw for the purpose of measuring the width of the groove as shown in FIG. 7 of the drawings. It is a type of feeler gauge with a go and no go mode of operation.

A gauge is also incorporated into the invention for the purpose of measuring the thickness or chain gage saw chain link which rides in the cutter bar groove. This gauge is formed in the tool in a manner similar to the bar groove gauge but it is the width of the grooves 29 in the plate rather than the width of the remaining projection between the grooves which is accurately formed in the plate. These grooves are likewise formed in the same graduations as the bar grooves of 50 thousandths (0.050), 58 thousandths (0.058), and 63 thousandths (0.063) of an inch. To measure the gage of a link of a saw chain, the track 31 of the chain, as opposed to the cutting edge, in other words, the portion of the link which rides in the groove of the cutter bar, is inserted into the recesses formed in the gauge in a go or no go fashion to determine the gage of the chain as shown in FIG. 6 of the drawings.

A set of precisely graduated aligned circular holes 33 are disposed in the plate along one edge thereof forming a gauge for measuring the chain pitch. These holes are set at standard graduations of 250 thousandths (0.250), 298 thousandths (0.298), 325 thousandths (0.325), 354 thousandths (0.354), 375 thousandths (0.375), 404 thousandths (0.404), 437 thousandths (0.437), and 500 thousandths (0.500) of an inch distances between the centers of the holes on the gauge for the purpose of permitting the centers of the rivets 35 of the chain links to be aligned with the centers of the particular set of holes for identifying the pitch of the chain. The operation of this gauge is shown in FIG. 5 of the drawings.

A trapezoidal recess 37 is formed in an edge of the plate with precise graduations 39 along the base edge of the recess for measuring the cutting tooth length.

The base edge 41 of the recess is the longer edge of the trapezoidal opening. The tooth length gauge is utilized by placing it over the top of a tooth with the cutting edge fitted into the corner of the trapezoidal opening with the longer edge of the cutter head disposed adjacent the base edge of the gauge as shown in FIG. 4 of the drawings. The graduations indicate the tooth length.

A depth gauge 43 is also incorporated into the tool for the purpose of measuring the height of the depth gauge on the cutter link to determine the depth for which the saw chain is set to cut. This gauge is formed by one or more holes 45 formed in a depressed portion of the flanges and which are disposed at the predetermined different heights below the under surface of the flange whereby the height of the depth gauge on a chain saw cutter tooth can be measured. This is done by placing a tooth under the flange of the tool with the depth gauge 47 of the link aligned with the hole 45 formed in the flange and depending upon which hole the top of the tooth aligns with it can be determined which depth the saw chain is set to cut at. The standard depths of cut are 30 thousandths (0.030) and 35 thousandths (0.035) of an inch. In addition, the depth gauge of the tool provides a file guide for shortening long depth gauges on the cutter links. Any exposed portion which sticks through the hole is simply filed off.

Because the top plates 49 of the teeth of the cutter links slope downward behind the cutting edge of the tooth, sharpening a cutter link drops the height of the tooth relative to the saw chain and the depth gauge of the cutter link must also be correspondingly lowered. The present device provides the capability of making this exact adjustment for each cutter link relative to its respective top plate.

It will be seen from the foregoing description that the invention will achieve all the objects and advantages attributed to it. While it has been described in detail, it should not be limited to such details except as may be necessitated by the appended claims.

I claim:

1. A chain saw gauge comprising
a plate having a file guide disposed at the top thereof for guiding a chain saw sharpening file at a 35° angle across the cutting edge of a cutter link of a saw chain held against said plate,
a precise set of graduated projections formed along the edge of said plate for measuring the width of the cutter bar groove,
a precise set of graduated recesses formed in the edge of said plate for measuring the chain gage,
a set of precisely aligned circular holes disposed in said plate at graduated predetermined distances for measuring the chain pitch,
a trapezoidal recess formed in one edge of said plate with precise graduations disposed along the base edge of said recess for measuring the cutting tooth top plate length, and
one or more holes formed in said plate and disposed at predetermined different heights below a surface of said plate whereby the height of the depth gauge of a chain saw cutter tooth can be measured.

2. A chain saw gauge comprising
a plate having a file guide disposed at the top thereof for guiding a chain saw sharpening file at a 35° angle across the cutting edge of a cutter link of a saw chain held against said plate,
a precise set of graduated projections formed along the edge of said plate for measuring the width of the cutter bar groove,
a precise set of graduated openings formed in said plate for measuring the chain gage,
a set of precisely aligned circular holes disposed in said plate at graduated predetermined distances for measuring the chain pitch,
a trapezoidal opening formed in said plate with precise graduations disposed along one edge of said recess for measuring the cutting tooth top plate length, and
means formed on said plate for measuring the height of the depth gauge of a chain saw cutter tooth.

* * * * *